United States Patent
Tong et al.

(10) Patent No.: US 12,025,106 B2
(45) Date of Patent: Jul. 2, 2024

(54) STORED ENERGY TRANSMISSION MECHANISM AND STORED ENERGY-DRIVEN WHEEL

(71) Applicant: ROYALBABY CYCLE BEIJING CO., LTD., Beijing (CN)

(72) Inventors: Lixin Tong, Beijing (CN); Mengjing Chen, Zhejiang (CN)

(73) Assignee: ROYALBABY CYCLE BEIJING CO., LTD., Beijing (CN)

( * ) Notice: Subject to any disclaimer, the term of this patent is extended or adjusted under 35 U.S.C. 154(b) by 178 days.

(21) Appl. No.: 17/862,845

(22) Filed: Jul. 12, 2022

(65) Prior Publication Data
US 2023/0009204 A1    Jan. 12, 2023

Related U.S. Application Data

(63) Continuation of application No. PCT/CN2021/124056, filed on Oct. 15, 2021.

(30) Foreign Application Priority Data

Jul. 7, 2021  (CN) .......................... 202121540408.X

(51) Int. Cl.
*F03G 3/08* (2006.01)
*F03G 1/02* (2006.01)
*F03G 1/06* (2006.01)

(52) U.S. Cl.
CPC ............... *F03G 1/022* (2021.08); *F03G 1/06* (2013.01); *F03G 3/08* (2013.01)

(58) Field of Classification Search
CPC ... F03G 1/022; F03G 1/06; F03G 1/08; F03G 3/08; A63H 29/04; A63H 29/20; B62M 1/105
(Continued)

(56) References Cited

U.S. PATENT DOCUMENTS

2017/0097072 A1    4/2017   Carames Jimenez

FOREIGN PATENT DOCUMENTS

| CN | 1085860 A | 4/1994 |
|----|-----------|--------|
| CN | 2414987 Y | 1/2001 |

(Continued)

OTHER PUBLICATIONS

International Search Report Cited in PCT/CN2021/124056, Mar. 28, 2022; 10 Pages.

*Primary Examiner* — Phillip A Johnson
(74) *Attorney, Agent, or Firm* — Cooper Legal Group, LLC

(57) ABSTRACT

The present application relates to the technical field of a wheel, and particularly to a stored energy transmission mechanism and stored energy-driven wheel. In particular, a stored energy transmission mechanism is integrated with a rotating component, which is used to drive the rotating component. The stored energy transmission mechanism includes a center shaft, an elastic component, a transmission cover, a flywheel, and a flywheel seat. The elastic component is sleeved outside the center shaft and positioned in the transmission cover, with one end being fixedly connected with the center shaft and the other end being fixedly connected with the transmission. When the transmission cover is rotated and fitted with the center shaft, it can tighten the elastic component to store energy.

9 Claims, 6 Drawing Sheets

(58) Field of Classification Search
USPC .......................................................... 446/464
See application file for complete search history.

(56) References Cited

FOREIGN PATENT DOCUMENTS

| | | | | | |
|---|---|---|---|---|---|
| CN | 105147468 | A | | 12/2015 | |
| CN | 105539660 | A | * | 5/2016 | |
| CN | 205952226 | U | | 2/2017 | |
| CN | 107697215 | A | * | 2/2018 | |
| CN | 113335435 | A | | 9/2021 | |
| GB | 1509299 | A | * | 5/1978 | ............. A63H 29/04 |
| WO | WO-2014190610 | A1 | * | 12/2014 | ............ B62M 1/105 |

\* cited by examiner

STORED ENERGY TRANSMISSION MECHANISM AND STORED ENERGY-DRIVEN WHEEL

CROSS-REFERENCE TO RELATED APPLICATIONS

This application is a continuation of PCT application serial no. PCT/CN2021/124056, filed on Oct. 15, 2021, which claims the priority and benefit of Chinese patent application serial no. 202121540408.X, filed on Jul. 7, 2021. The entirety of PCT application serial no. PCT/CN2021/124056 and Chinese patent application serial no. 202121540408.X are hereby incorporated by reference herein and made a part of this specification.

TECHNICAL FIELD

The present application relates to the technical field of wheels, and particularly to a stored energy transmission mechanism and stored energy-driven wheel.

BACKGROUND ART

As well known, the shaft connected to the rear wheel of the pull-back toy car is fixedly connected to the gear of the pull-back gear. When the car is applied with a backward work by a hand, the rear wheels rotate backward and transmit force via the shaft to the pull-back gear to do work so that the gear drives the pull-back gear structure to convert kinetic energy into potential energy. When the hand is released, the pull-back toy car releases the potential energy to realize the automatic advance of the pull-back toy car.

Based on this, the problems of optimizing the above structure of the pull-back toy car and applying the above principle of the pull-back toy car to a scooter, balance car, bicycle, etc., need to be solved, thereby making it have various functions and improve the pleasure of control. In a related technology, for example, a patent publication with Publication No. CN 205952226 discloses a rotating mechanism and a bicycle, including an elastic component, a first flywheel, a second flywheel, and a transmission component. The transmission component includes a first gear, a second gear, and a third gear, the second gear internally meshes with the first gear, and the second gear meshes with the third gear. The second gear is positioned between the first gear and the third gear, and the third gear is connected to the second flywheel. One end of the elastic component is connected to the transmission component, one end of the elastic component connected to the transmission component is connected to the first flywheel, and the other end of the elastic component is fixed relative to the axis of the first flywheel. The rotating mechanism can store force for the elastic component and release the elastic force of the elastic component. When the elastic force is released, the first flywheel can be driven to rotate. However, the structure of the rotating mechanism is complex and mounted outside the wheel, so it is necessary to optimize its structure.

SUMMARY

In view of the above shortcomings and deficiencies in the existing technology, one of the purposes of the present application is to solve one or more of the above problems in the existing technology. In other words, one of the purposes of the present application is to provide a stored energy transmission mechanism and a stored energy-driven wheel that meets one or more of the above requirements.

In order to achieve the purpose of the present application, the present application adopts the following technical solution.

A stored energy transmission mechanism is integrated with a rotating component and configured to drive the rotating component. The stored energy transmission mechanism includes a center shaft, an elastic component, a transmission cover, a flywheel, and a flywheel seat. The elastic component is sleeved outside the center shaft and positioned in the transmission cover, with one end being fixedly connected with the center shaft and the other end being fixedly connected with the transmission. When the transmission cover rotatably cooperates with the center shaft, it can tighten the elastic component to store energy.

The transmission cover is fixedly connected to the outer or inner ring of the flywheel, and, correspondingly, the outer or inner ring of the flywheel is fixedly connected to the flywheel seat. The flywheel seat is mounted on the rotating component.

The rotating component, the transmission cover, and the flywheel seat are respectively mounted on the center shaft.

In the present application, the rotation of the transmission cover can tighten the elastic component to store energy. After storing energy, restoring of the spring piece after tightening can counterclockwise rotate drive the transmission cover, and further counterclockwise rotate the stored energy transmission of the wheel hub, thereby realizing the stored energy transmission of the rotating component. This optimizes the structure of stored energy transmission and renders the structure simpler.

Optionally, the rotating component is formed with a mounting slot for mounting the stored energy transmission mechanism. The stored energy transmission mechanism is integrated with the rotating components, and the overall structure is more compact.

Optionally, the flywheel seat covers the slot opening of the mounting slot of the rotating component.

Optionally, the rotating component has a mounting cylinder with openings at both ends for mounting a stored energy transmission mechanism.

The stored energy transmission mechanism has two flywheels, which are respectively positioned on both sides of the transmission cover, the flywheel seat corresponds to the flywheel one by one, and the two flywheel seats respectively cover the openings at both ends of the mounting cylinder of the rotating component.

Optionally, one end of the elastic component is provided with a fixing hole, the center shaft is provided with a threaded hole, and a screw extends through the fixing hole of the elastic component and is threaded with the threaded hole of the center shaft to fixedly connect one end of the elastic component to the center shaft.

Optionally, the transmission cover is formed with an insertion opening along the axis direction of the center shaft.

The other end of the elastic component is arranged with an insertion portion, and the insertion portion is in insertion connection with the insertion opening of the transmission cover.

Optionally, the insertion portion of the elastic component is formed by bending the elastic component. No additional fixing components are required.

Optionally, the elastic component is a spring piece, which has sufficient transmission power and involves a convenient processing manner.

Optionally, the flywheel seat includes a seat body and a cylinder column protruding above the seat body; the seat body is fixedly mounted on the rotating component. The outer wall of the cylinder column is connected to the inner ring thread of the flywheel, and the center shaft extends through the inner cavity of the cylinder column.

The present applicant also provides a stored energy-driven wheel, which includes a wheel hub integrated with the stored energy transmission mechanism according to any of the above technical solutions.

Compared with conventional technologies, the beneficial effect of the present applicant is that:

the stored energy transmission mechanism of the present applicant has the advantages of simple structure and high transmission efficiency. Specifically, the rotation of the transmission cover is used to tighten the elastic component to store energy. After storing energy, restoring the spring piece after tightening can counterclockwise rotate the transmission cover and further counterclockwise rotate the stored energy transmission of the wheel hub, thereby realizing the stored energy transmission of the rotating component. This optimizes the structure of stored energy transmission.

DETAILED DESCRIPTION

In order to explain the Embodiment of the present application more clearly, specific embodiments of the present application will be described below with accompanying drawings. Obviously, the accompanying drawings described below are only some embodiments of the present application. For those skilled in the art, other figures and other embodiments can be obtained according to these accompanying drawings without paying creative labor.

Embodiment 1

Figure 1:
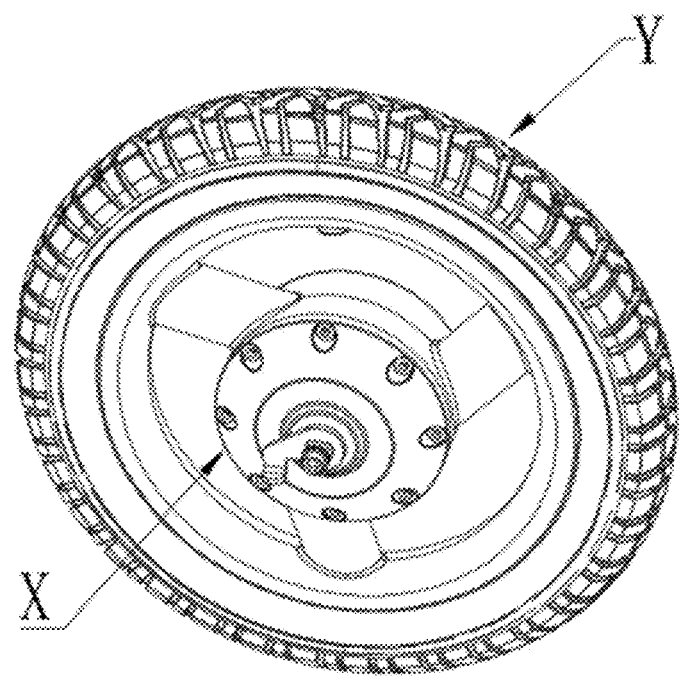
FIG. 1 is a structural diagram of the stored energy transmission mechanism of Embodiment 1 of the present application, which is mounted on the wheel to form the stored energy-driven wheel.
Figure 2:
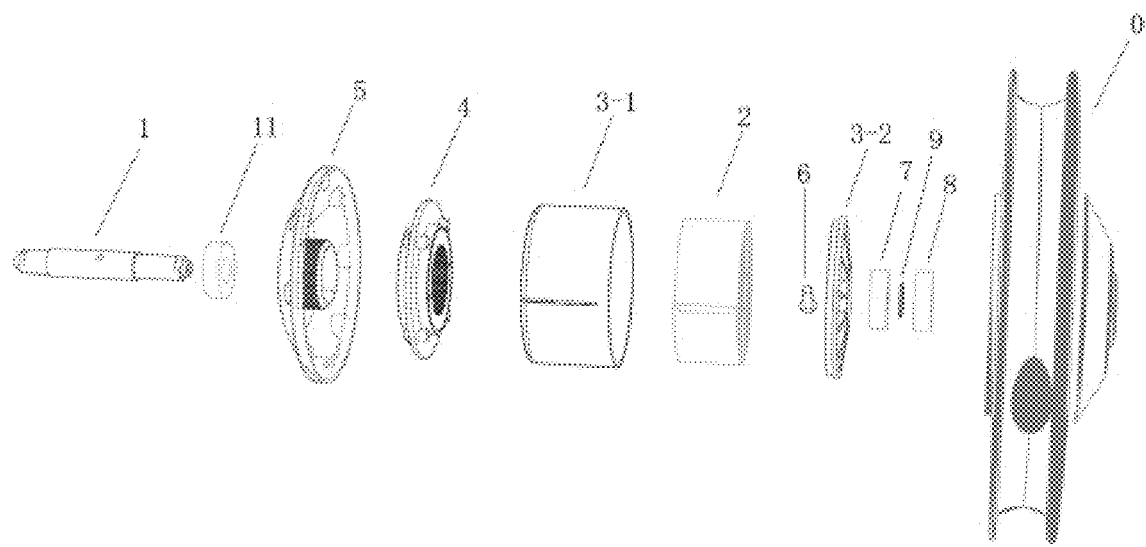
FIG. 2 is an exploded diagram of the structure of the stored energy transmission mechanism according to Embodiment 1 of the present application.
Figure 3:
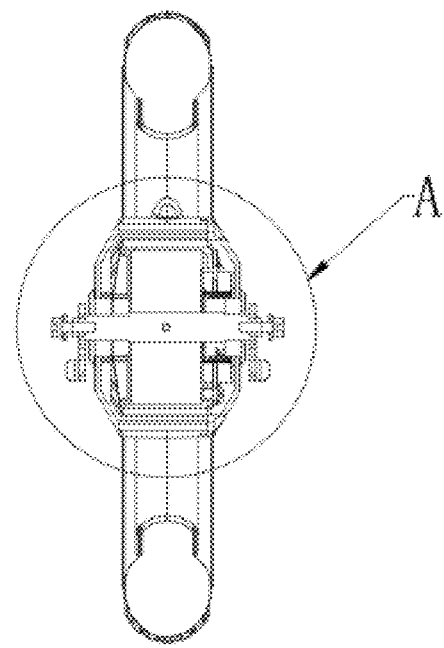
FIG. 3 is a half sectional diagram of the stored energy-driven wheel of Embodiment 1 of the present application (omitting the spring piece)

As shown in FIG. 1, a stored energy transmission mechanism X in this Embodiment is integrated with a rotating component Y and used for driving the rotating component Y to rotate. In particular, a wheel is illustrated as a rotating component; that is, the stored energy-driven wheel of Embodiment is obtained. In addition, the rotating component is not limit to the wheel of the Embodiment, and it is also applicable to other existing rotating components.

As shown in FIGS. 2-11, the stored energy transmission mechanism of the Embodiment includes a center shaft 1, a spring piece 2, a transmission cover 3, a flywheel 4, and a flywheel seat 5.

Figure 4:
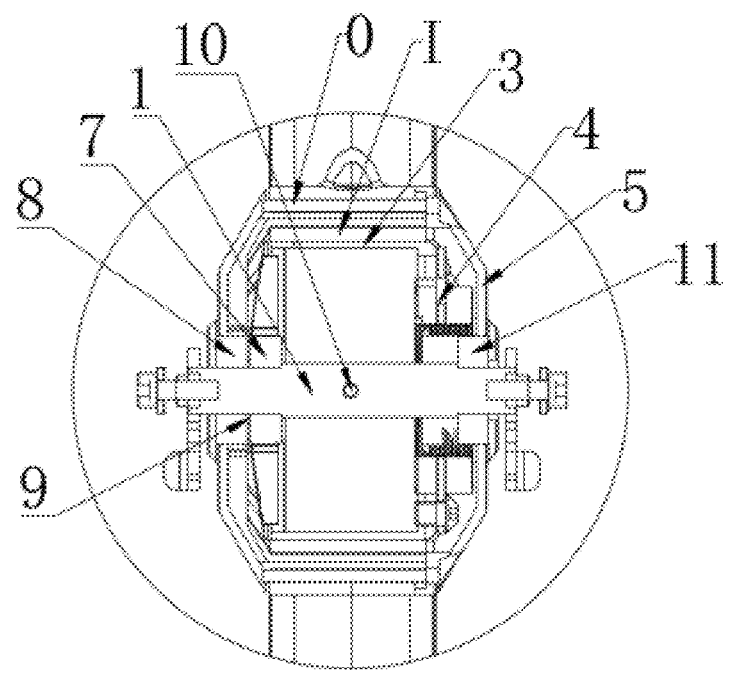
FIG. 4 is an enlarged diagram of Portion A in FIG. 3.
Figure 5:
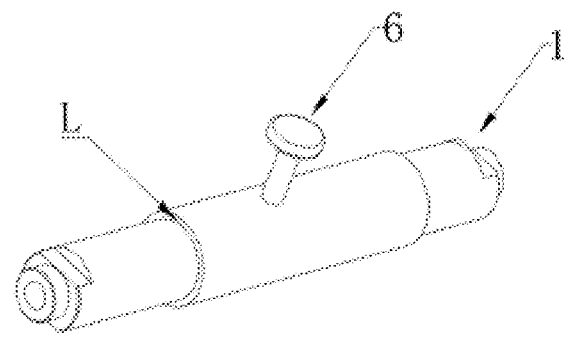
FIG. 5 is a structural diagram of the center shaft of Embodiment 1 of the present application.
Figure 6:
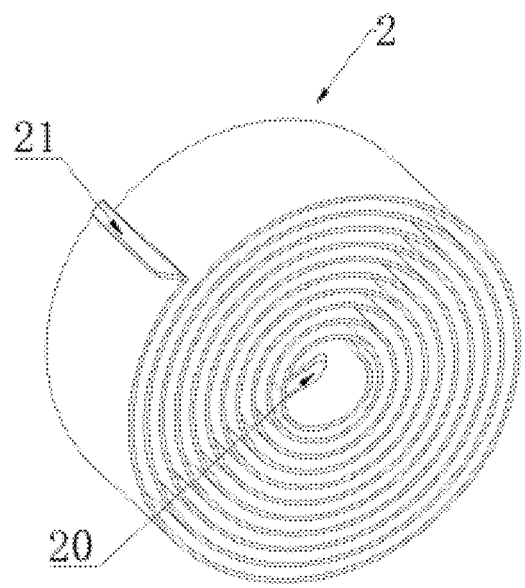
FIG. 6 is a structural diagram of the spring piece of Embodiment 1 of the present application after winding.

In particular, as shown in FIGS. 4-6, the spring piece 2 is coiled around the middle position of the center shaft 1, the inner end of the spring piece 2 is fixedly connected with the center shaft 1, and the outer end of the spring piece 2 is fixedly connected with the transmission cover 3. The advantage of this design lies in that, when the transmission cover 3 is rotatably cooperated with the center shaft 1, it can tighten the spring piece 2, thereby realizing the effect of energy storage, being ready for subsequent energy release and transmission. In addition, the spring piece 2 is positioned in the transmission cover 3, so as to avoid the exposure of the spring piece 2 and ensure the stability of tightening and restoring of the spring piece 2, and provide a high safety. Specifically, the inner end of the spring piece 2 is formed with a fixing hole 20, and the center shaft 1 is formed with a threaded hole 10. The screw 6 is extended through the fixing hole 20 at the inner end of the screw 6 and threaded connected with the threaded hole 10, so as to fix the inner end of the spring piece 2 on the center shaft 1. In addition, the head of the outer end of the spring piece 2 can be bent, thereby forming an insertion portion 21.

Figure 7:
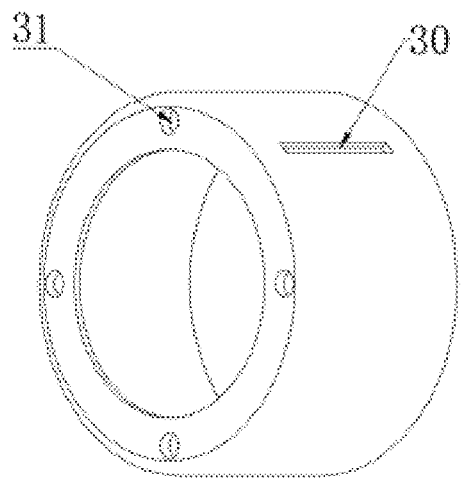
FIG. 7 is a structural diagram of the cover body of the transmission cover according to Embodiment 1 of the present application.
Figure 8:
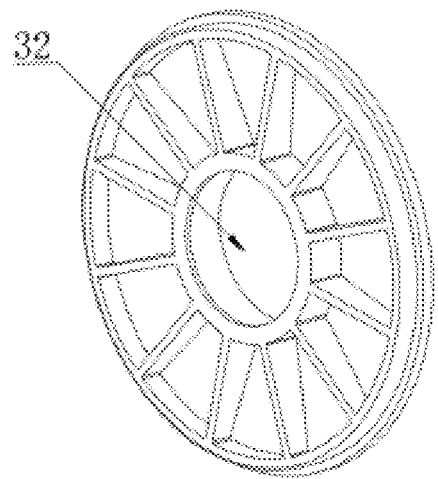
FIG. 8 is a structural diagram of the cover lid of the transmission cover according to Embodiment 1 of the present application.

As shown in FIGS. 7-8, the transmission cover 3 includes a cover body 3-1 and a cover lid 3-2. The cover body 3-1 is a cylindrical structure with two open ends, the side wall of which is formed with an insertion hole 30. The insertion hole 30 has a length corresponding to the width of the spring piece 2, so that the insertion portion 21 of the spring piece 2 can be stably inserted and fixed in the insertion hole 30 of the transmission cover 3, so that the stability of energy storage and transmission can be improved. In this Embodiment, by making full use of the rigidity characteristics of the spring piece 2, the spring piece can be directly bent to form the insertion portion 21, without the need of additional fixing piece, thereby simplifying the corresponding fixed connection structure. In particular, the cover lid covers the opening at one end of the cover body 3-1, and the diameter of the opening at the other end is smaller than the opening covered by the cover lid 3-2, which is convenient for the assembling of the spring piece 2 and the subsequent installation of the flywheel 4.

In particular, the width of the spring piece 2 in this Embodiment is 30 mm, which ensures a sufficient transmission force and convenient machining. The width of the spring piece 2 can be selected and adjusted depending on the actual use demand. The optional range is 5-60 mm, which can basically meet the demand of different usage scenarios, but it is not limited to 5-60 mm, which will not be repeated here.

The center shaft 1 in this Embodiment penetrates through both ends of the transmission cover 3. As shown in FIG. 8, the bearing 7 mounted at one end of the cover lid through the bearing hole 32 of the cover is mounted with the center shaft 1, and the diameter of the opening at the other end is smaller for mounting the flywheel 4. Specifically, the opening wall of the opening with a smaller diameter on the transmission cover 3 is fixedly connected to the outer ring of the flywheel 4. The inner ring of the flywheel 4 is fixedly connected to the flywheel seat 5, and the flywheel seat 5 is mounted on the wheel hub 0 of the wheel.

Figure 9:
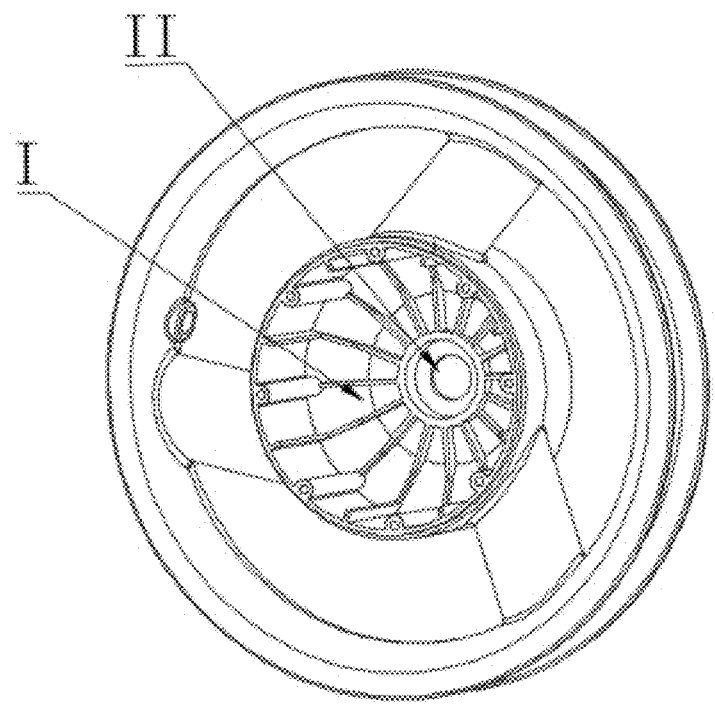
FIG. 9 is a structural diagram of the wheel hub according to Embodiment 1 of the present application.

As shown in FIG. 9, the wheel hub is formed with a mounting slot I which is used to mounted the stored energy transmission mechanism, so that the stored energy transmission mechanism and the wheel hub 0 are integrated with each other and the whole structure is more compact. Specifically, the mounting slot I of the wheel hub 0 extends along the axis of the center shaft 1, with one side being open and the other side being formed with a wheel shaft mounting hole II. The transmission cover 3 is mounted in the mounting slot I of the wheel hub 0, and the opening with a smaller diameter on the transmission cover 3 faces the open side of the mounting slot I. The mounting hole II of center shaft 1 of the wheel hub 0 is formed with a bearing 8, the inner hole of the bearing 8 is used for the penetration and installation of the center shaft 1. A retaining ring 9 sleeved outside the center shaft 1 is arranged between the inner rings of the bearing 7 and the bearing 8.

Figure 10:
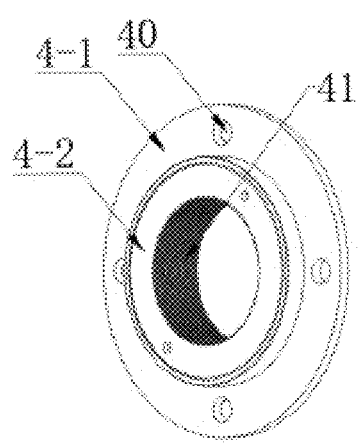
FIG. 10 is a structural diagram of the flywheel according to Embodiment 1 of the present application.
Figure 11:
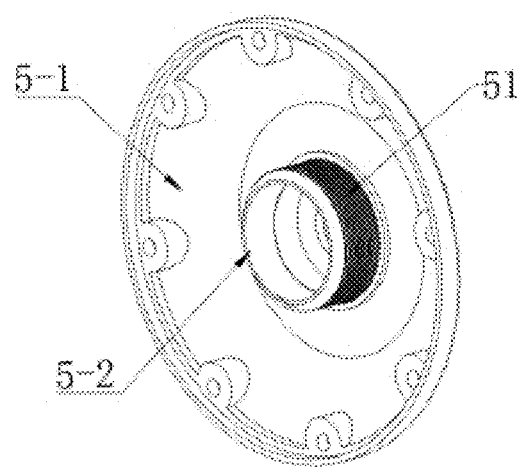
FIG. 11 is a structural diagram of the flywheel seat according to Embodiment 1 of the present application.

As shown in FIG. 10, the flywheel 4 in the Embodiment is a four-hole toothless flywheel. Four bolts or screws respectively extends through four mounting holes 40 of the flywheel and are connected with the threaded holes 31 formed on the opening wall of the opening with a smaller diameter on the transmission cover 3, so that the cover body of the transmission cover 3 can be fixed to the outer ring 4-1 of the flywheel 4. The outer ring 4-1 of the flywheel 4 is a ratchet ring and the inner ring of the flywheel 4 is a pawl ring. For details, reference can be made to the structure of the existing common four-hole toothless flywheel, which will not be described here. The inner ring 4-2 of the flywheel 4 has an inner thread 41. Correspondingly, as shown in FIG. 11, the flywheel seat 5 includes a seat body 5-1 and a cylinder column 5-2 protruding above seat body 5-1, and the cylinder column 5-2 has an outer thread 51 connected to the inner thread 41 of the inner ring of the flywheel 4. The seat body 5-1 is fixedly mounted on the side wall at the open side of the mounting slot I through bolts or screws for covering the opening of the mounting slot I of the wheel hub 0.

In addition, the center shaft 1 extends through the inner cavity of the cylinder column 5-2 and is mounted via the bearing 11. The center shaft 1 extends through the two sides of the mounting slot, so that the two ends of the center shaft 1 can be mounted on the corresponding fixing plate (such as the rear fork of the car frame). In particular, as shown in FIG. 5, a step structure L is arranged on the center shaft 1 corresponding to mounting positions of individual bearings, so that it can prevent the condition of the axial movement of the bearings and ensure the stability of stored energy transmission.

In this present application, the wheel hub 0, the transmission cover 3, the flywheel 4 and the flywheel seat 5 are all assembled coaxially with the center shaft 1, so as to ensure the coaxiality of the whole stored energy transmission mechanism and the stability of stored energy transmission.

The transmission principle of the stored energy transmission mechanism in this Embodiment is as follows.

The counterclockwise rotation of the wheel hub 0 drives counterclockwise rotation of the transmission cover 3, and further tightens the spring piece 2 to store energy. After storing energy, restoring of spring piece 2 after tightening can counterclockwise rotate the transmission cover 3 and further counterclockwise rotate the wheel hub 0, thereby realizing the stored energy transmission of the wheel hub 0.

As shown in FIG. 1, this Embodiment further provides a stored energy-driven wheel, which includes a wheel hub integrated with the stored energy transmission mechanism of this Embodiment and can realize self-driving after energy storage.

Embodiment 2

The stored energy transmission mechanism in this Embodiment is different from Embodiment 1 is that:

There are two flywheels and flywheel seats respectively.

Correspondingly, the wheel hub is provided with a mounting cylinder with openings at both ends, that is, the other side opposite to the slot opening is also designed as an opening on the basis of the mounting slot I of Embodiment 1, adapted to mount the flywheel and flywheel seat.

In addition, the transmission cover can also have no cover, the two flywheels are respectively mounted at both ends of the cover body of the transmission cover, and the two flywheel seats respectively cover the openings at both ends of the mounting cylinder of the wheel hub. That is, the flywheel and the mounting structure of flywheel seat on one side of the wheel hub in Embodiment 1 is mirrored to the other side of the wheel hub, thereby obtaining a double flying wheel structure. Reference can be made to the installation structure of the flywheel, the flywheel seat and the center shaft, the transmission cover and wheel hub in Embodiment 1 for specific installation details, which will not be repeated here. In this way, the double flying wheel design is adopted, which can further improve the stability of stored energy transmission.

Reference can be made to Embodiment 1 for other structures.

Embodiment 3

The stored energy transmission mechanism in this Embodiment is different from Embodiment 1 in that:

the spring piece can also be replaced by a spiral spring or other existing common elastic components, as long as the elastic components can realize the function of tightening and energy storage.

The wheel hub of the stored energy-driven wheel of the Embodiment is integrated with the stored energy transmission mechanism in the Embodiment.

Reference can be made to Embodiment 1 for other structures.

Embodiment 4

The stored energy transmission mechanism in this Embodiment is different from Embodiment 1 in that:

the fixing structure between the outer end of the spring piece and the transmission cover can also be replaced by the existing common fixing connection structures, for example, those adopting bolt fixing and snap connection.

The wheel hub of the stored energy-driven wheel of the Embodiment is integrated with the stored energy transmission mechanism in the Embodiment;

Reference can be made to Embodiment 1 for other structures.

Embodiment 5 the stored energy transmission mechanism in this Embodiment is different from Embodiment 1 in that:

the transmission cover can also be fixedly connected with the inner ring of the flywheel. Correspondingly, the flywheel seat is fixedly connected with the outer ring of the flywheel, which can also realize the effect of stored energy transmission.

The wheel hub of the stored energy-driven wheel of the Embodiment is integrated with the stored energy transmission mechanism in the Embodiment.

Reference can be made to Embodiment 1 for other structures.

The above is only a detailed description of the preferred embodiments and principles of the present application. For those skilled in the art, changes can be made to the specific implementation way according to the idea provided by the present application, and these changes should also be regarded as falling within the protection scope of the present application.

What is claimed is:

1. A stored energy transmission mechanism integrated on a rotating component and configured to drive the rotating component, wherein the stored energy transmission mechanism comprises a center shaft, an elastic component, a transmission cover, a flywheel, and a flywheel seat; the elastic component is sleeved outside the center shaft and positioned in the transmission cover, a first end of the elastic component is fixedly connected to the center shaft, and a second end of the elastic component is fixedly connected to the transmission cover; and when the transmission cover rotatably cooperates with the center shaft, the transmission cover tightens the elastic component to store energy;

the transmission cover is fixedly connected to an outer ring or an inner ring of the flywheel; correspondingly, the outer ring or the inner ring of the flywheel is fixedly connected to the flywheel seat; and the flywheel seat is mounted on the rotating component; and the rotating component, the transmission cover, and the flywheel seat are respectively mounted on the center shaft.

2. The stored energy transmission mechanism according to claim 1, wherein the rotating component is provided with a mounting slot for mounting the stored energy transmission mechanism.

3. The stored energy transmission mechanism according to claim 2, wherein the flywheel seat covers a slot opening of the mounting slot of the rotating component.

4. The stored energy transmission mechanism according to claim 1, wherein one end of the elastic component is provided with a fixing hole, the center shaft is provided with a threaded hole, and a screw extends through the fixing hole of the elastic component and is threaded with the threaded hole of the center shaft to fixedly connect the one end of the elastic component to the center shaft.

5. The stored energy transmission mechanism according to claim 1, wherein the transmission cover is provided with an insertion opening along an axial direction of the center shaft; and the second end of the elastic component is provided with an insertion portion, and the insertion portion is in insertion connection with the insertion opening of the transmission cover.

6. The stored energy transmission mechanism according to claim 5, wherein the insertion portion of the elastic component is formed by bending the elastic component.

7. The stored energy transmission mechanism according to claim 1, wherein the elastic component is a spring piece.

8. The stored energy transmission mechanism according to claim 1, wherein the flywheel seat comprises a seat body and a cylinder column protruding above the seat body, the seat body is fixedly mounted on the rotating component; an outer wall of the cylinder column is connected to thread of the inner ring of the flywheel, and the center shaft extends through an inner cavity of the cylinder column.

9. A stored energy-driven wheel, comprising a wheel hub, wherein the wheel hub is integrated with the stored energy transmission mechanism according to claim 1.

* * * * *